US010471965B2

(12) United States Patent
Kingsbury et al.

(10) Patent No.: US 10,471,965 B2
(45) Date of Patent: Nov. 12, 2019

(54) SECURING GUEST ACCESS TO VEHICLE (71) Applicant: Lenovo (Singapore) Pte. Ltd., Singapore (SG)

(72) Inventors: Timothy Winthrop Kingsbury, Cary, NC (US); Justin Tyler Dubs, Raleigh, NC (US); Christopher Aaron Whitesock, Clayton, NC (US); Rod D. Waltermann, Rougemont, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 107 days.

(21) Appl. No.: 15/243,166

(22) Filed: Aug. 22, 2016

(65) Prior Publication Data

US 2018/0050700 A1 Feb. 22, 2018

(51) Int. Cl.
*B60R 25/25* (2013.01)
*B60W 50/00* (2006.01)
*B60R 25/24* (2013.01)
*B60W 40/08* (2012.01)

(52) U.S. Cl.
CPC ....... *B60W 50/0098* (2013.01); *B60R 25/241* (2013.01); *B60W 2040/0809* (2013.01); *B60W 2050/0075* (2013.01); *B60W 2540/28* (2013.01)

(58) Field of Classification Search
USPC ..... 701/1, 2, 29.1, 29.2, 36, 45, 49; 340/5.1, 340/5.21, 5.72, 426.1, 426.13, 436.14
See application file for complete search history.

(56) References Cited

U.S. PATENT DOCUMENTS

| | | | | |
|---|---|---|---|---|
| 4,550,402 A * | 10/1985 | Gable | ..................... | H04L 29/00 370/438 |
| 5,519,260 A * | 5/1996 | Washington | ............ | B60R 25/04 123/198 DC |
| 5,874,889 A * | 2/1999 | Higdon | ................... | G01C 21/26 307/10.2 |
| 5,880,679 A * | 3/1999 | Lenart | ..................... | B60R 25/04 180/168 |
| 5,917,405 A * | 6/1999 | Joao | ....................... | B60R 25/018 340/426.17 |
| 5,991,308 A * | 11/1999 | Fuhrmann | ........... | H03M 13/256 370/395.53 |
| 6,009,075 A * | 12/1999 | Roberts | ................... | H04J 3/085 370/219 |
| 6,144,989 A * | 11/2000 | Hodjat | ................... | G06N 5/043 709/202 |
| 6,188,667 B1 * | 2/2001 | Roberts | ................... | H04J 3/085 370/219 |
| 6,232,874 B1 * | 5/2001 | Murphy | ................ | B60R 25/012 340/426.19 |
| 6,542,076 B1 * | 4/2003 | Joao | ...................... | B60R 25/018 340/539.14 |
| 6,549,130 B1 * | 4/2003 | Joao | ..................... | B60R 25/018 340/539.14 |

(Continued)

*Primary Examiner* — Jonathan L Sample
(74) *Attorney, Agent, or Firm* — Ference & Associates LLC (57) ABSTRACT One embodiment provides a method, including: obtaining, using a sensor, biometric data of a user; determining, using a processor, that the biometric data of the user does not match biometric data of a known user; and adjusting, based on the biometric data of the user, a vehicle setting. Other aspects are described and claimed.

21 Claims, 4 Drawing Sheets

(56) References Cited

U.S. PATENT DOCUMENTS

| | | | | |
|---|---|---|---|---|
| 6,587,040 B2* | 7/2003 | Seto | ................ | B60R 25/04 307/10.2 |
| 6,850,252 B1* | 2/2005 | Hoffberg | ............ | G06K 9/00369 348/E7.061 |
| 6,940,847 B1* | 9/2005 | Glitho | ................ | H04M 7/126 370/352 |
| 7,010,682 B2* | 3/2006 | Reinold | ................ | H04L 9/3271 7/100 |
| 8,884,739 B2* | 11/2014 | Shimomura | ......... | B60R 25/403 340/5.62 |
| 10,164,985 B2* | 12/2018 | Turgeman | ............ | H04L 63/102 |
| 2002/0121969 A1* | 9/2002 | Joao | ................ | B60R 25/018 340/425.5 |
| 2002/0140545 A1* | 10/2002 | Nietupski | ............... | B60R 25/00 340/5.72 |
| 2002/0156555 A1* | 10/2002 | Obradovich | ....... | B60G 17/0195 701/1 |
| 2002/0163449 A1* | 11/2002 | Flick | ................ | B60R 25/04 340/988 |
| 2003/0034873 A1* | 2/2003 | Chase | ................ | G06Q 10/02 340/5.2 |
| 2003/0231550 A1* | 12/2003 | Macfarlane | .......... | B60R 25/257 367/198 |
| 2004/0008103 A1* | 1/2004 | Kady | ................ | B60R 25/04 340/5.52 |
| 2004/0010358 A1* | 1/2004 | Oesterling | .......... | B60R 16/0231 701/49 |
| 2004/0017281 A1* | 1/2004 | Dix | ................ | B60R 25/04 340/5.61 |
| 2004/0204795 A1* | 10/2004 | Harvey | ................ | B60R 25/04 701/1 |
| 2007/0200663 A1* | 8/2007 | White | ................ | A61B 5/145 340/5.31 |
| 2008/0228365 A1* | 9/2008 | White | ................ | B60K 28/063 701/70 |
| 2009/0276120 A1* | 11/2009 | Harvey | ................ | B60R 25/04 701/36 |
| 2012/0130563 A1* | 5/2012 | McBain | ............ | B64D 45/0015 701/3 |
| 2014/0309806 A1* | 10/2014 | Ricci | ................ | B60Q 1/00 701/1 |
| 2015/0033305 A1* | 1/2015 | Shear | ................ | G06F 21/45 726/11 |
| 2015/0210287 A1* | 7/2015 | Penilla | ................ | B60W 40/08 701/49 |
| 2015/0363986 A1* | 12/2015 | Hoyos | ................ | H05K 999/99 340/5.61 |
| 2016/0139755 A1* | 5/2016 | Bushmitch | ................ | H04L 9/32 715/707 |
| 2016/0185358 A1* | 6/2016 | Todasco | ................ | B60W 50/12 701/48 |
| 2016/0300050 A1* | 10/2016 | Hecht | ................ | G06F 21/32 |
| 2016/0300054 A1* | 10/2016 | Turgeman | ............ | H04L 63/08 |
| 2016/0304051 A1* | 10/2016 | Archer | ................ | A62C 27/00 |
| 2017/0174180 A1* | 6/2017 | Hoyos | ................ | H05K 999/99 |

\* cited by examiner

SECURING GUEST ACCESS TO VEHICLE

BACKGROUND

Vehicles are conventionally secured using keys. For example, a car is conventionally secured using door locks (whether mechanical or electronic) that are opened with a key or handheld electronic device. While this secures access to the vehicle generally, limiting access to the vehicle in a refined way requires additional measures.

A conventional approach to limiting access to a vehicle in a refined way is to utilize a valet key, i.e., a key providing reduced access, e.g., one that is not able to open the glove compartment and trunk. For example, when a car's keys are loaned to a second person, such as a friend, valet or mechanic, then it may be beneficial to provide reduced access to the car's functionality. Limiting access can be important for privacy or security related reasons.

BRIEF SUMMARY

In summary, one aspect provides a method, comprising: obtaining, using a sensor, biometric data of a user; determining, using a processor, that the biometric data of the user does not match biometric data of a known user; and adjusting, based on the biometric data of the user, a vehicle setting.

Another aspect provides a device, comprising: a biometric sensor; a processor operatively coupled to the biometric sensor; and a memory that stores instructions executable by the processor to: obtain, using the biometric sensor, biometric data of a user; determine that the biometric data of the user does not match biometric data of a known user; and adjust, based on the biometric data of the user, a vehicle setting.

A further aspect provides a vehicle, comprising: a plurality of components comprising wheels, a motor, and one or more seats disposed in a vehicle compartment; a biometric sensor; and an electronic device, comprising: a processor operatively coupled to the biometric sensor; and a memory that stores instructions executable by the processor to: obtain, using the biometric sensor, biometric data of a user; determine that the biometric data of the user does not match biometric data of a known user; and adjust, based on the biometric data of the user, a vehicle setting.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When a car's keys are loaned to another person, such as a friend of the car's owner, a valet or a mechanic, then it may be beneficial to provide reduced access to the car's functionality. Limiting access can be important for privacy or security related reasons. This problem is commonly handled with a valet key that is not able to open the glove compartment and trunk.

A primary drawback of valet keys is that people are rarely aware of them and rarely carry them. Moreover, even if a valet key is being used, then it is important to lock the trunk and glovebox beforehand.

Accordingly, an embodiment uses biometric identification techniques to distinguish between users, e.g., the owner of the car and someone else that has access to the car. Biometric identification is utilized in many circumstances. For example, security mechanisms often are based on, or include, use of a biometric component such as a fingerprint reader, an iris scanner, a voice recognition mechanism, an image analysis/facial detection mechanism, etc., that can be used to identify a particular user. For example, system access (e.g., login credentialing) might be conditioned on a biometric identification. In addition to security mechanisms, biometric identification is utilized to customize a system or device. For example, biometric identification might be used to properly identify a particular user and thereafter load the particular user's preferred device settings.

Biometric identification of a car's owner can occur through a wide range of possible strategies including, but not limited to facial recognition, seat position, weight or weight distribution, finger prints, voice recognition, and the order of operations undertaken when in the vehicle (such as adjusting rearview mirror and thereafter releasing an emergency brake, etc.). An embodiment utilizes such biometrics to identify a user and appropriately adjust vehicle settings in a predetermined and configurable way. For example, if the primary owner of the car is detected, then full access to the vehicle's functionality is available. In some cases, these privileges may be extended to a second owner or other user as well.

In an embodiment, if an unrecognized driver or vehicle operator is detected, then the vehicle can continue to function, but with reduced accessibility or functionality. Examples of reduced accessibility or functionality include but are not limited to trunk, glovebox and other storage compartments locking automatically, stereo and navigation systems hiding or securing personal information including address books, travel history and entertainment media, overall power output or speed of the vehicle being reduced, vehicle range and freedom of travel being limited, etc. In an embodiment, a vehicle owner or other contact is automatically notified of any unusual activity through wireless communications, e.g., a notification may be issued in response to detection of an unidentified driver or operator.

The illustrated example embodiments will be best understood by reference to the figures. The following description is intended only by way of example, and simply illustrates certain example embodiments.

Figure 1:
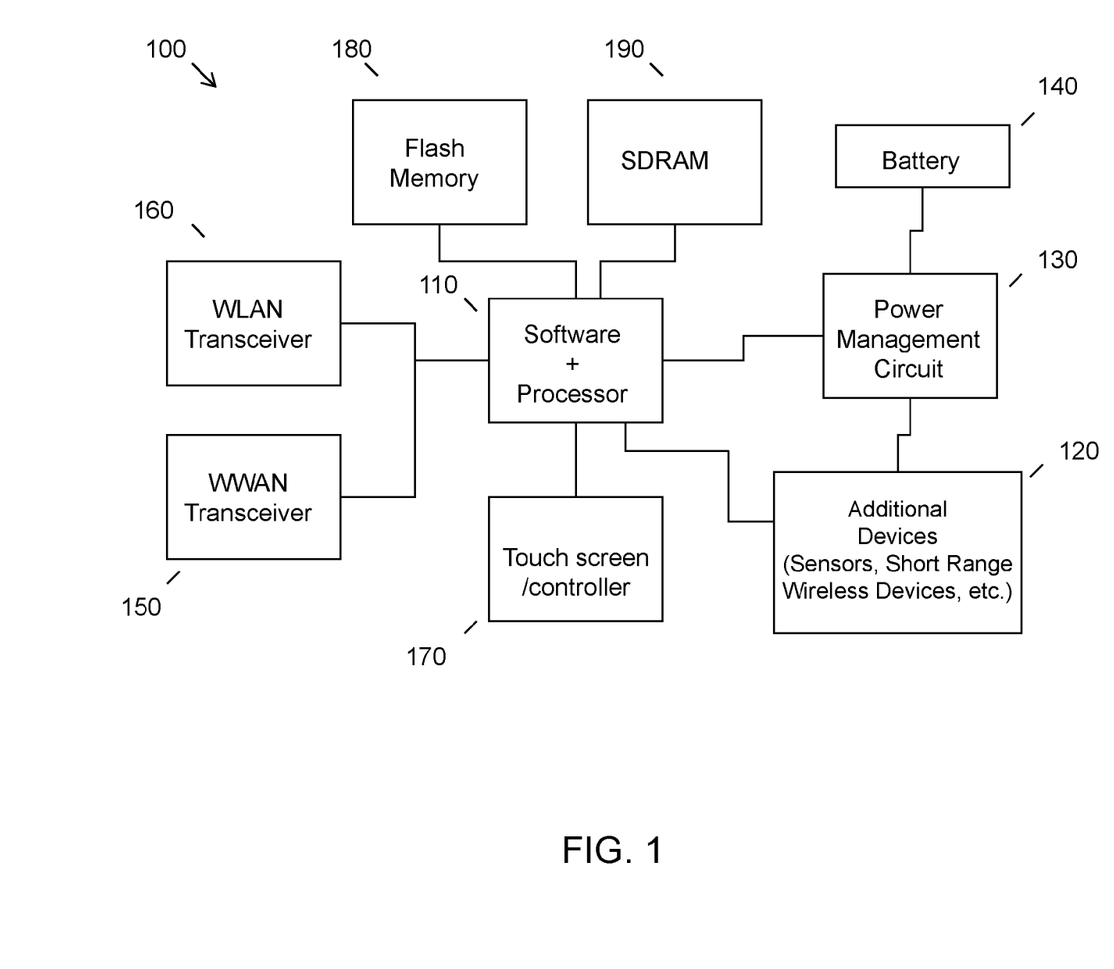
FIG. 1 illustrates an example of information handling device circuitry.

While various other circuits, circuitry or components may be utilized in information handling devices, with regard to mobile device circuitry 100, an example illustrated in FIG. 1 includes a system on a chip design found for example in many smaller or mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included and may be added based on a particular design. For example, additional devices 120 may include a sensor or sensor(s), for example an optical sensor such as a camera and/or an infrared sensor, contact based sensors, weight sensors, a fingerprint reader, a microphone, etc., as well as short range wireless devices, e.g., BLUETOOTH wireless communication devices. System 100 often includes a touch screen 170 for data input and display/rendering. System 100 also typically includes various memory devices, for example flash memory 180 and SDRAM 190.

Figure 2:
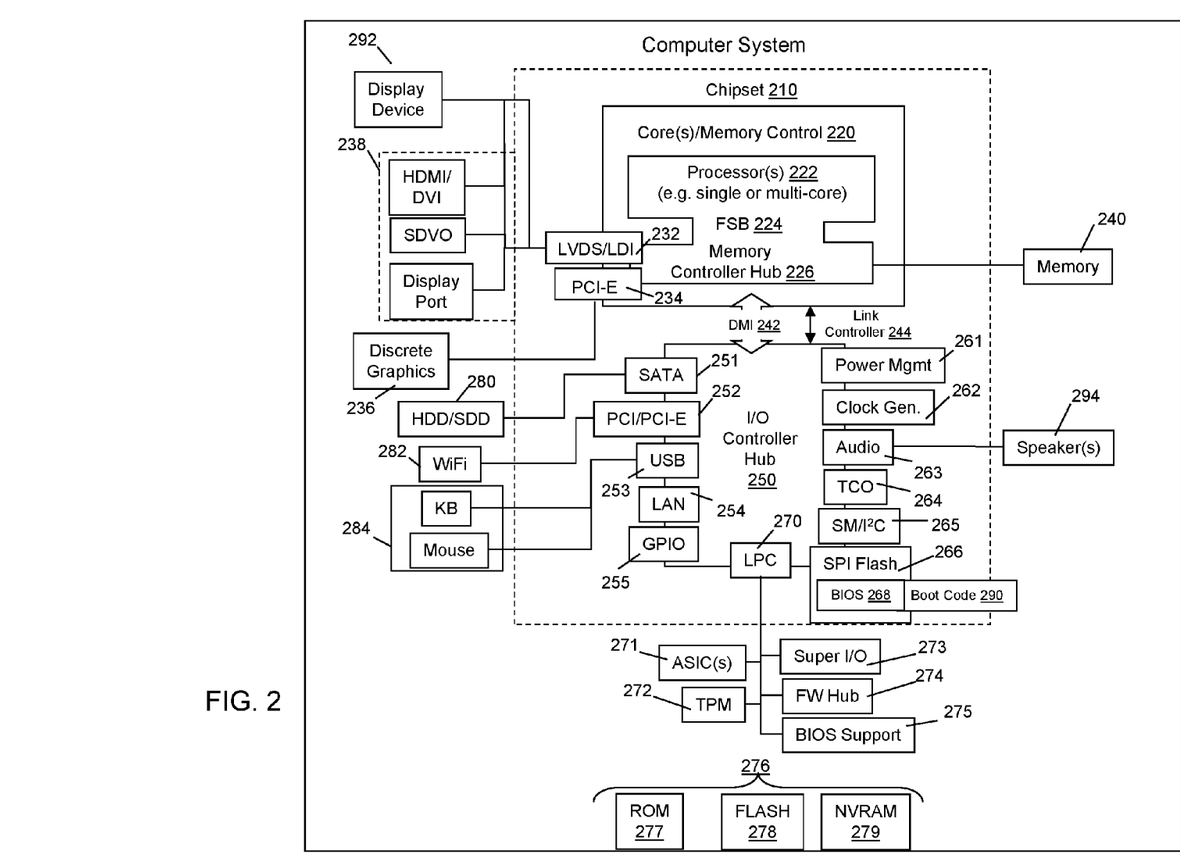
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, biometric data capture device, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as an onboard computer in a vehicle, e.g., a car. The circuitry outlined in FIG. 1 and/or FIG. 2 may be included in a computing device of a vehicle that accepts inputs, e.g., image data, voice or audio data, fingerprint data, and the like, and processes the inputs in order to identify a user, e.g., a driver or operator of a vehicle, using biometric techniques. Moreover, a computing device of a vehicle may be utilized to provide outputs, e.g., in response to a biometric identification of a driver or operator of the vehicle, or lack thereof. The output(s) may automate adjustment of various vehicle settings, e.g., increasing or reducing access to various functions of the vehicle, increasing or reducing accessibility to certain vehicle compartments, etc., as further described herein.

Figure 3:
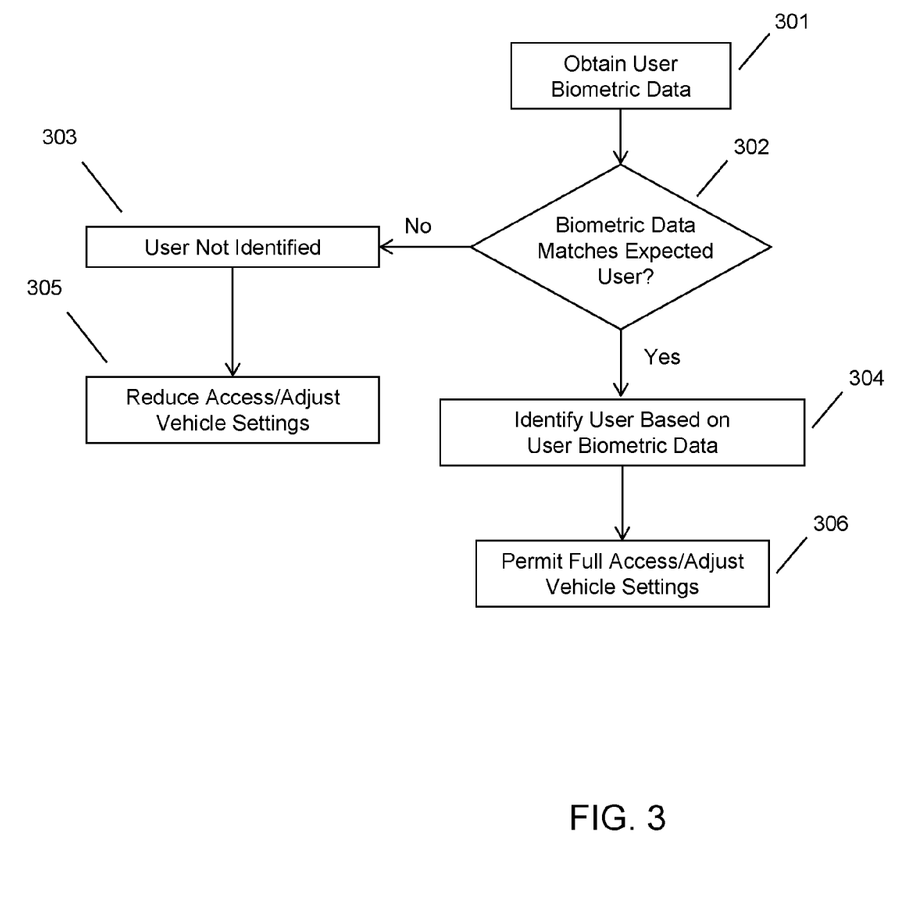
FIG. 3 illustrates an example method of using biometric identification for adjusting vehicle settings.

Turning to FIG. 3, an embodiment obtains user biometric data, e.g., from sensors disposed in a vehicle, at 301. The user biometric data may include facial recognition data, seat position data, weight or weight distribution data, finger print data, voice recognition data, and data indicating the order of operations undertaken when in the vehicle.

User biometric data therefore may take a variety of forms. For example, the user biometric data obtained at 301 may include weight data collected from a weight sensor included in a seat of the vehicle and reported wirelessly to a device such as a car's onboard computer. As another example, user biometric data might include weight distribution data collected from a plurality of weight sensors, where the weight distribution data permits an inference or calculation of a user's posture as he or she sits in a seat of the vehicle. Further, the user biometric data may include seat configuration data, e.g., data indicating that the seat's position, the seat component physical configuration (e.g., a back of the seat has been tilted, data indicating that a seat has been raised or lowered, etc.). As a further example, user biometric data may include seat contact data, e.g., data from contact, temperature or pressure sensors disposed within a vehicle seat indicating that a user is contacting or pressing on a particular part of the seat. As a yet further example, user biometric data may include facial or voice recognition data, e.g., image and/or audio data that indicates that a particular user is seated in a vehicle. As a further example, user biometric data may include fingerprint data collected from a fingerprint sensor provided within the vehicle compartment, e.g., a fingerprint reader may be provided on an object such as a gear shift, a steering column, a touch screen of a media center, etc.

As will be appreciated by those having skill in the art, various types of user biometric data may be combined to provide a biometric signature of a particular user. This biometric signature may be refined over time, e.g., by collecting user biometric data repeatedly and updating a user's biometric signature. In an embodiment, the user may enroll in a system, whether provided by the vehicle or a remote system, to provide biometric signature data and configure vehicle settings that are to be implemented automatically in response to biometric identification or lack thereof.

The user biometric data obtained at 301 is used to determine if the user biometric data matches expected user biometric data at 302. That is, the currently detected user biometric data obtained at 301 is compared to known user biometric data of a particular user in order to identify the particular user. The known user biometric data may be stored locally or accessed from a remote device. The known user biometric data may include a biometric signature or profile that has been generated based on historically detected user biometric data.

If the user is identified, as illustrated at 304, using the user biometric data obtained at 301, i.e., the currently detected user biometric data is similar or equivalent to known user biometric data, the user may be granted full access to the vehicle, have continued access to the vehicle functionality and capabilities, or have particular vehicle settings (e.g., user-specific or customized settings) loaded, as illustrated at 306. Otherwise, i.e., if a user is not identified at 302, as illustrated at 303, the lack of user identification may lead to a requirement for reducing access to the vehicle, as illustrated at 305, which may be implemented by adjusting vehicle settings to reduce the vehicle's functionality, locking vehicle compartments, etc.

For example, a guest setting may be applied to a vehicle or device contained within the vehicle, e.g., onboard media player, if a particular user (e.g., the vehicle's owner) is not identified at 302. Similarly, if a particular user is not identified at 302, a valet setting may be applied to an automobile computer or other vehicle-connected device (e.g., smart phone), certain compartments of the vehicle, e.g., trunk, glove box, etc., may be locked, etc. The guest or valet setting therefore may include reduced access to certain vehicle features. By way of specific example, if a particular user is identified at 302, full vehicle access or user-specific vehicle access is granted at 306. In contrast, i.e., if a particular user is not identified at 302, reduced functionality may be implemented for a vehicle. For example, reduced accessibility or functionality includes but are is limited to locking of the trunk, locking of the glovebox and/or other storage compartments, stereo and navigation systems hiding or securing personal information including address books, travel history and entertainment media, overall power output or speed of the vehicle being reduced, vehicle range and freedom of travel being limited, etc., as illustrated at 305.

User biometric data may be used to identify a user at various times. For example, an embodiment may utilize user biometric data upon vehicle entry and/or on an on-going basis. By way of specific example, user biometric data may be obtained at 301, and a determination made at 302, repeatedly, e.g., according to a policy as a user operates the vehicle. Thus, the user may be initially granted access (with or without use of biometric identification) and thereafter may be required to continue to supply correct user biometric data in order to maintain the level of access to the vehicle. This permits the use of user biometric data to supplement other types of security mechanisms that might be applied, e.g., use of a physical or electronic key, etc.

Figure 4:
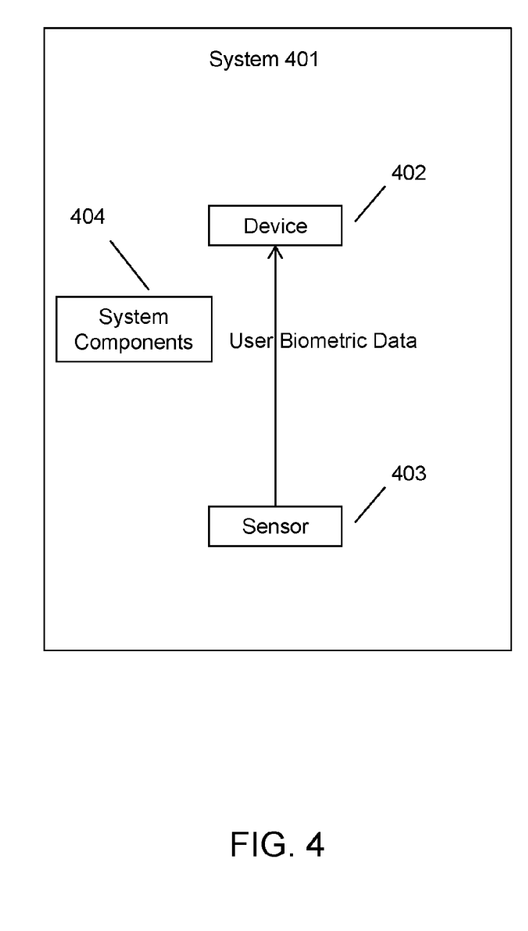
FIG. 4 illustrates an example system that uses biometric identification for adjusting vehicle settings.

The use of biometric data in biometric identification may be applied in a wide variety of vehicle types. Turning to FIG. 4, an example system 401 is illustrated. As shown, a system 401 may include a combination of: a device 402 (such as a vehicle computing device; and a sensor 403 (such as a biometric sensor). The system 401 may include various other system components 404, e.g., peripheral devices that communicate with the device 402 and/or the sensor 403, vehicle components such as an engine, wheels, vehicle seats, etc.

Data about a user's identity can be gathered from a variety of sensors, e.g., in a seat (including but not limited to sensors in a seat back or bottom, sensors in or on the legs of a seat, a camera directed towards or viewing a seat, a microphone, etc.). The sensors provide dynamic biometric based measurements, for example measurements of pressure, weight distribution, seat tilt, image data, audio data, and heat or temperature data.

In an embodiment, biometric data is used on an ongoing basis. For example, in the case where multiple users share the same vehicle, a user's biometric data may provide data for determining the current user's identity and adjusting the vehicle's settings appropriately.

As an example, if a different driver sits down in another user's car seat, a number of biometric details might be flagged as different or non-matching, e.g., as illustrated at 302, 303 of FIG. 3. For example, metrics such as the user's method of sitting down and adjusting the rear view mirror, the total weight in the seat and the positioning of the weight from left to right and front to back within the seat might not be correct in terms of an expected user's biometric posture data, a user's voice data may be different from another users, as may be the user's appearance (detected using image data). Thus, if the biometrics do not match the expected user, then different vehicle settings might be implemented, e.g., the vehicle's electronics might be set to a valet mode, the vehicle's seat may be automatically moved or adjusted, the vehicle storage compartments may be locked, etc.

In an embodiment, if a different or unidentified user is detected, as illustrated at 302, 303 of FIG. 3, an automated communication may be sent, e.g., to a predetermined contact, e.g., a primary owner's smart phone. This permits a particular user to be apprised of the fact that another user has been detected within the vehicle.

An embodiment therefore provides for automated vehicle setting adjustment using biometric identification techniques. In an embodiment, this permits a guest to access and operate a vehicle under conditions prescribed or configured by the vehicle's owner.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
obtaining, using a sensor, biometric data of a user, wherein the biometric data is associated with a series of user interactions performed in a predetermined order, wherein each interaction in the series is performed on a unique mechanical component resident in a vehicle cabin;
determining, using a processor, that the series of user interactions does not match the predetermined order; and
adjusting, based on the determining, a vehicle setting.

2. The method of claim 1, wherein the vehicle setting is selected from the group consisting of a vehicle access setting, a vehicle electronic device access setting, a vehicle electronic device application level access setting, a vehicle power setting, a vehicle compartment setting, a vehicle range setting, and a vehicle speed setting.

3. The method of claim 1, wherein the adjusting comprises changing the vehicle setting to restrict access.

4. The method of claim 1, wherein the adjusting comprises changing the vehicle setting to restrict functionality.

5. The method of claim 1, comprising obtaining registration biometric data of the known user.

6. The method of claim 5, wherein the obtaining registration biometric data of the known user comprises receiving the registration biometric data of the known user from a remote device.

7. The method of claim 6, wherein the receiving comprises receiving the registration biometric data of the known user over a short range wireless connection.

8. The method of claim 1, comprising implementing a vehicle owner profile for the known user comprising a plurality of preferred vehicle settings.

9. The method of claim 8, wherein the adjusting comprises changing one or more of the plurality of preferred vehicle settings.

10. The method of claim 1, comprising initiating a communication to the known user in response to the determining that the biometric data of the user does not match biometric data of a known user.

11. A device, comprising:
a biometric sensor;
a processor operatively coupled to the biometric sensor; and
a memory that stores instructions executable by the processor to:
obtain, using the biometric sensor, biometric data of a user, wherein the biometric data is associated with a series of user interactions performed in a predetermined order, wherein each interaction in the series is performed on a unique mechanical component resident in a vehicle cabin;
determine that the series of user interactions does not match the predetermined order; and
adjust, based on the determining, a vehicle setting.

12. The device of claim 11, wherein the vehicle setting is selected from the group consisting of a vehicle access setting, a vehicle electronic device access setting, a vehicle electronic device application level access setting, a vehicle power setting, a vehicle compartment setting, a vehicle range setting, and a vehicle speed setting.

13. The device of claim 11, wherein the processor executes instructions to adjust the vehicle setting by changing the vehicle setting to restrict access.

14. The device of claim 11, wherein the processor executes instructions to adjust the vehicle setting by changing the vehicle setting to restrict functionality.

15. The device of claim 11, wherein the processor executes instructions to obtain registration biometric data of the known user.

16. The device of claim 15, wherein the processor executes instructions to obtain registration biometric data of the known user by receiving the registration biometric data of the known user from a remote device.

17. The device of claim 16, further comprising a short range wireless device, wherein the registration biometric data of the known user is received using the short range wireless device.

18. The device of claim 11, wherein the processor executes instructions to implement a vehicle owner profile for the known user comprising a plurality of preferred vehicle settings.

19. The device of claim 18, wherein the processor executes instructions to adjust the vehicle setting by changing one or more of the plurality of preferred vehicle settings.

20. A vehicle, comprising:
a plurality of components comprising wheels, a motor, and one or more seats disposed in a vehicle compartment;
a biometric sensor; and
an electronic device, comprising:
a processor operatively coupled to the biometric sensor; and
a memory that stores instructions executable by the processor to:
obtain, using the biometric sensor, biometric data of a user, wherein the biometric data is associated with a series of user interactions performed in a predetermined order, wherein each interaction in the series is performed on a unique mechanical component resident in a vehicle cabin;
determine that the series of user interactions does not match the predetermined order; and
adjust, based on the biometric data of the user, a vehicle setting.

21. The vehicle of claim 20, wherein the processor adjusts a vehicle setting to disable the motor in response to determining that the biometric data of the user does not match biometric data of the known user.

* * * * *